United States Patent [19]

Omae et al.

[11] 4,163,886
[45] Aug. 7, 1979

[54] CONTROL APPARATUS FOR AN AUTOMATIC PIPE WELDER

[75] Inventors: Tsutomu Omae; Keiziro Sakai, both of Hitachi, Japan

[73] Assignee: Hitachi, Ltd., Japan

[21] Appl. No.: 833,561

[22] Filed: Sep. 15, 1977

[30] Foreign Application Priority Data

Sep. 16, 1976 [JP] Japan .................................. 51-109926
Nov. 19, 1976 [JP] Japan .................................. 51-138429

[51] Int. Cl.² .............................................. B23K 9/12
[52] U.S. Cl. ............................ 219/60 A; 219/125.11; 228/9
[58] Field of Search ....................... 219/60 R, 60 A, 61, 219/125.1, 125.11; 228/7, 9, 12; 266/56, 58, 59; 364/103, 108, 110

[56] References Cited

U.S. PATENT DOCUMENTS

| 3,207,881 | 9/1965  | Pagan ............................ 219/60 A |
| 3,267,251 | 8/1966  | Anderson ........................ 219/125.1 |
| 3,404,252 | 10/1968 | Michael ............................. 219/110 |
| 3,471,278 | 10/1969 | Griem, Jr. .......................... 364/108 |
| 3,513,302 | 5/1970  | Jacques et al. ...................... 364/108 |
| 3,555,239 | 1/1971  | Kerth ................................... 266/58 |
| 3,651,290 | 3/1972  | Durbin et al. .................... 219/60 A |
| 3,737,614 | 6/1973  | Paulange .......................... 219/60 A |
| 4,019,016 | 4/1977  | Friedman et al. ...................... 228/7 |

OTHER PUBLICATIONS

A. J. Weissberger, "Microprocessors Simplify Industrial Control", Electronic Design 22, 10/25/75, pp. 96-99.

Primary Examiner—C. L. Albritton
Assistant Examiner—Clifford C. Shaw
Attorney, Agent, or Firm—Craig and Antonelli

[57] ABSTRACT

Disclosed is a control apparatus for an automatic pipe welder, for controlling the automatic pipe welder which continuously butt welds pipes while it is running along a welding line on the periphery of a pipe, in accordance with predetermined welding conditions for each of a plurality of welding areas sectioned along the welding line. All of the welding conditions for the welding areas are stored in a digital storage device while welding conditions on an area currently being welded are stored in another storage device. The contents of the second-mentioned digital storage device are converted by a digital-analog converter to analog signals, which are then held respectively in corresponding sample and hold circuits. Outputs of the sample and hold circuits are supplied as control commands to respective control units which control the welder in accordance with the welding conditions. In this manner, the construction of the control apparatus and a control panel thereof is simplified.

8 Claims, 11 Drawing Figures

FIG. 4

| Addresses | Contents |
|---|---|
| A | WELDER RUNNING SPEED IN AREA Ⓐ—Ⓑ |
| A + 1 | WEAVING SPEED IN AREA Ⓐ—Ⓑ |
| A + 2 | WEAVING WIDTH IN AREA Ⓐ—Ⓑ |
| A + 3 | WELDING VOLTAGE IN AREA Ⓐ—Ⓑ |
| A + 4 | WELDING WIRE FEEDING SPEED IN AREA Ⓐ—Ⓑ |
| A + 5 | WELDING CURRENT IN AREA Ⓐ—Ⓑ |
| A + 6 | WELDER RUNNING SPEED IN AREA Ⓑ—Ⓒ |
| A + 7 | WEAVING SPEED IN AREA Ⓑ—Ⓒ |
| A + 8 | WEAVING WIDTH IN AREA Ⓑ—Ⓒ |
| A + 9 | WELDING VOLTAGE IN AREA Ⓑ—Ⓒ |
| A + 10 | WELDING WIRE FEEDING SPEED IN AREA Ⓑ—Ⓒ |
| A + 11 | WELDING CURRENT IN AREA Ⓑ—Ⓒ |
| ⋮ | ⋮ |
| A + 30 | WELDER RUNNING SPEED IN ARER Ⓕ—Ⓐ |
| A + 31 | WEAVING SPEED IN AREA Ⓕ—Ⓐ |
| A + 32 | WEAVING WIDTH IN AREA Ⓕ—Ⓐ |
| A + 33 | WELDING VOLTAGE IN AREA Ⓕ—Ⓐ |
| A + 34 | WELDING WIRE FEEDING SPEED IN AREA Ⓕ—Ⓐ |
| A + 35 | WELDING CURRENT IN AREA Ⓕ—Ⓐ |

FIG. 5

| RWC | ADC | DAIN |
|---|---|---|

| Addresses | Contents |
|---|---|
| 0 | WELDER RUNNING SPEED |
| 1 | WEAVING SPEED |
| 2 | WEAVING WIDTH |
| 3 | WELDING VOLTAGE |
| 4 | WELDING WIRE FEEDING SPEED |
| 5 | WELDING CURRENT |

FIG. 11

| Addresses | Contents |
|---|---|
| A | WELDER RUNNING SPEED IN AREA Ⓐ-Ⓑ OF 1ST LAYER |
| ⋮ | ⋮ |
| A + 5 | WELDING CURRENT IN AREA Ⓐ-Ⓑ OF 1ST LAYER |
| ⋮ | ⋮ |
| A + 30 | WELDER RUNNING SPEED IN AREA Ⓕ-Ⓐ OF 1ST LAYER |
| ⋮ | ⋮ |
| A + 35 | WELDING CURRENT IN AREA Ⓕ-Ⓐ OF 1ST LAYER |
| A + 36 | WELDER RUNNING SPEED IN AREA Ⓐ-Ⓑ OF 2ND LAYER |
| ⋮ | ⋮ |
| A + 41 | WELDING CURRENT IN AREA Ⓐ-Ⓑ OF 2ND LAYER |
| ⋮ | ⋮ |
| A + 66 | WELDER RUNNING SPEED IN AREA Ⓕ-Ⓐ OF 2ND LAYER |
| ⋮ | ⋮ |
| A + 71 | WELDING CURRENT IN AREA Ⓕ-Ⓐ OF 2ND LAYER |
| ⋮ | ⋮ |
| $A+36(n-1)$ | WELDER RUNNING SPEED IN AREA Ⓐ-Ⓑ OF N-TH LAYER |
| $A+36(n-1)+5$ | WELDING CURRENT IN AREA Ⓐ-Ⓑ OF N-TH LAYER |
| ⋮ | ⋮ |
| $A+36(n-1)+30$ | WELDER RUNNING SPEED IN AREA Ⓕ-Ⓐ OF N-TH LAYER |
| $A+36(n-1)+35$ | WELDING CURRENT IN AREA Ⓕ-Ⓐ OF N-TH LAYER |

CONTROL APPARATUS FOR AN AUTOMATIC PIPE WELDER

LIST OF PRIOR ART REFERENCES

The following references are cited to show the state of the art:

U.S. Pat. No. 3,266,700 to H. C. Bauer et al. Aug. 16, 1966, Cl. 223-5

U.S. Pat. No. 3,266,701 to H. J. Peignen Aug. 16, 1966, Cl. 228-27

U.S. Pat. No. 3,373,914 to W. A. Wall Jr. Mar. 19, 1968, Cl. 228-8

Copending U.S. Patent Application Ser. No. 829,891 entitled "METHOD FOR CONTROLLING AN AUTOMATIC PIPE WELDER", filed on Sept. 1, 1977 by inventors Tsutomu OMAE and Keijiro SAKAI, claiming Convention Priority of Japanese Patent Application No. 104872/76, and assigned to the same assignee as the present application.

BACKGROUND OF THE INVENTION

The present invention relates to a control apparatus for an automatic pipe welder, and more particularly to a control command generating circuit suited to a control apparatus for an automatic pipe welder.

Recently, an automatic pipe welder which butt welds pipes while running along the circumference of the pipe has been frequently used. When the pipes are butt welded by such a welder, gravity applied to the molten metal changes with the position, at which the welder is running while welding, on the periphery of the pipe. Accordingly, it is a common practice to change the welding conditions such as welding current, welding voltage, feeding speed of a welding wire, welding velocity, weaving pattern and the like, depending on the welding position. To this end, as many potentiometers as the number of conditions to be changed are required for setting the welding conditions on respective positions on the periphery of the pipe. Further, in case of multi-layer welding where one joint is welded through several welding steps, the welding conditions may be changed from layer to layer. In such a case, potentiometers for setting the welding conditions on the respective positions for every layer are required. Since the number of potentiometers required is great, a control panel therefor must be of large size and wiring thereof must be very complex. In addition, the construction of a circuit for issuing commands for changing the welding conditions by switching the outputs of the potentiometers from layer to layer and from position to position on the periphery of the pipe must be also complex because of switching of analog voltages. In the light of the above disadvantages, it has been suggested to introduce a computer in the control apparatus for the automatic welder. However, the application of the computer particularly suitable for the control apparatus of the automatic pipe welder has not been proposed. If the computer is simply introduced with general purpose input-/output devices, the configuration of the control apparatus would be complex and of large size. Also, if the welding conditions to be represented by the potentiometers are stored in a storage device of the computer and simply read out in a sequential manner, the availability of the computer would be lowered.

SUMMARY OF THE INVENTION

It is an object of the present invention to provide a control apparatus for an automatic pipe welder, which eliminates the drawbacks due to the use of the potentiometers and which introduces a computer with a simple construction while enhancing the availability of the computer.

In accordance with the present invention, the drawbacks due to the use of a number of potentiometers and the problems considered in the introduction of the computer are resolved by storing in a digital storage device of a computer the welding conditions for each of welding areas sectioned along a welding line on the periphery of a pipe, storing in another digital storage device the welding conditions for an area currently being welded, which welding conditions are set from the first storage device of the computer, converting the contents of the second-mentioned digital storage device to analog signals by a digital-analog converter, holding the analog signals in respectively corresponding sample and hold circuits, and supplying the outputs of the sample and hold circuits as control commands to respective control units which control the welder in accordance with the welding conditions.

BRIEF DESCRIPTION OF THE DRAWINGS

FIGS. 1 and 2 are schematic views for illustrating the operation of an automatic pipe welder which butt welds pipes while running circumferentially on the pipe, in which FIG. 1 shows a view of the pipe and the welder taken axially of the pipe and FIG. 2 shows a side view of the welder of FIG. 1 with the pipe being shown in cross section taken in a plane including a pipe axis.

FIG. 4 shows the contents of a digital storage device with all of the welding conditions being stored therein.

FIG. 5 shows a format of a word stored in an address of the digital storage device.

FIG. 11 shows the contents of the digital storage device with all of the welding conditions for multi-layer welding being stored therein.

DESCRIPTION OF THE PREFERRED EMBODIMENT

Figure 1:
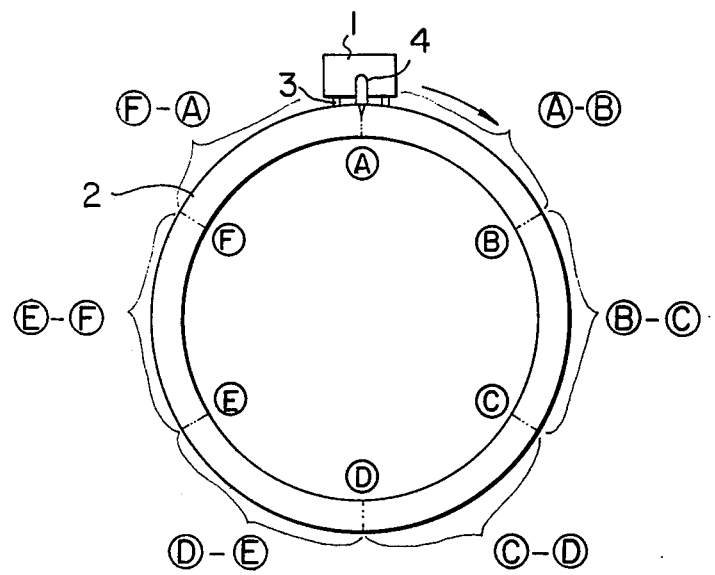
Figure 2:
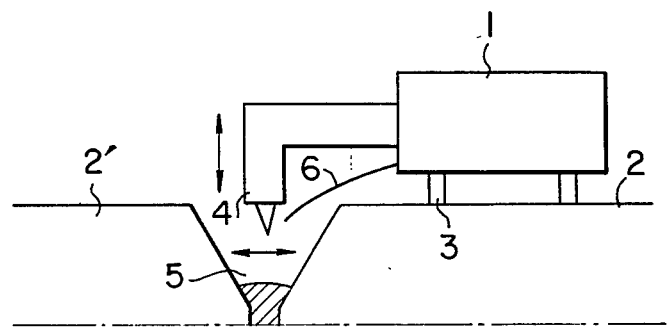
Figure 10:
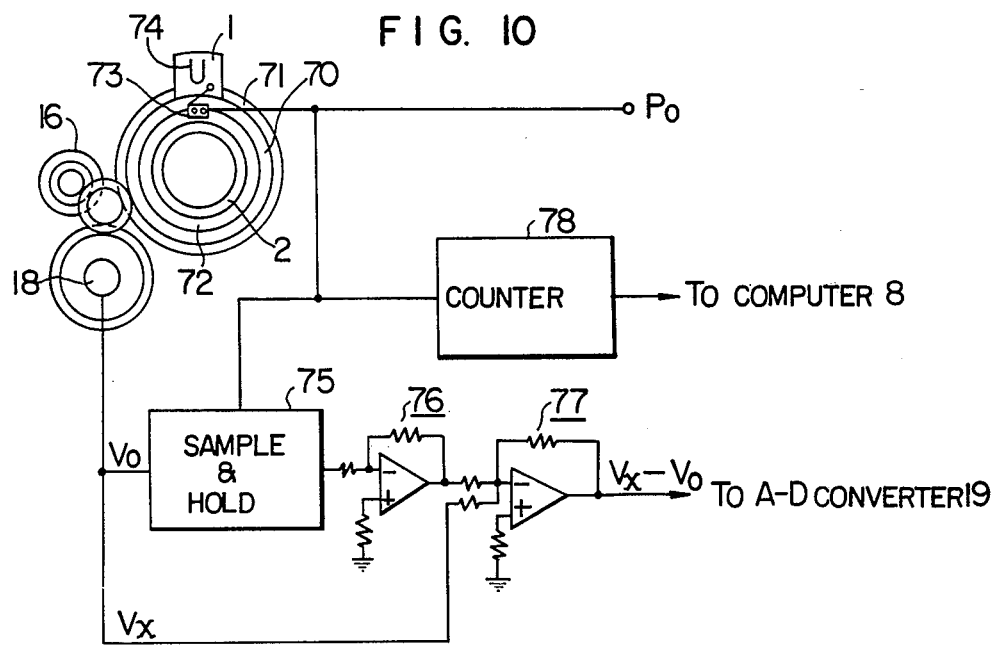
FIG. 10 shows an embodiment of a device for sensing the position of a welder.

Referring to FIG. 1, a welder 1 runs circumferentially on a pipe 2 or 2', which is a material to be welded, by wheels 3 and generates an arc from a welding torch 4 to butt weld the pipes 2 and 2'. The means for transporting the welder 1 is not limited to the wheels but may be a guide gear as shown in FIG. 10. As shown in FIG. 2, the welding torch 4 weaves laterally to a groove 5, that is, axially of the pipe and it is also controlled to be moved vertically, that is, toward the pipe axis in order to control an arc voltage. A welding wire 6 is fed at a predetermined speed.

Referring again to FIG. 1, when the welding is effected along the circumference of the pipe, the direction of welding changes substantially as the welder 1 runs. For example, at a point Ⓐ, the welding is effected with a downward arc, while at a point Ⓓ the welding is effected with an upward arc. Accordingly, uniform welded conditions for the points Ⓐ and Ⓓ cannot be maintained unless the welding conditions for the points Ⓐ and Ⓓ are properly changed. Therefore, it has been a common practice in the automatic pipe welder to change the welding conditions from position to position of the welder on the periphery of the pipe. In this case, a welding line on the periphery of the pipe is divided into a plurality of welding areas and welding conditions are established for each of the welding areas so that the welding conditions are changed as the welder 1 moves from one area to the adjacent area. As an example, in FIG. 1, when the welder 1 passes through a point Ⓑ, the welding conditions set to the area Ⓐ — Ⓑ are changed to the welding conditions set to the area Ⓑ — Ⓒ. The welder 1 is then controlled under the updated welding conditions between the points Ⓑ and Ⓒ.

Figure 3:
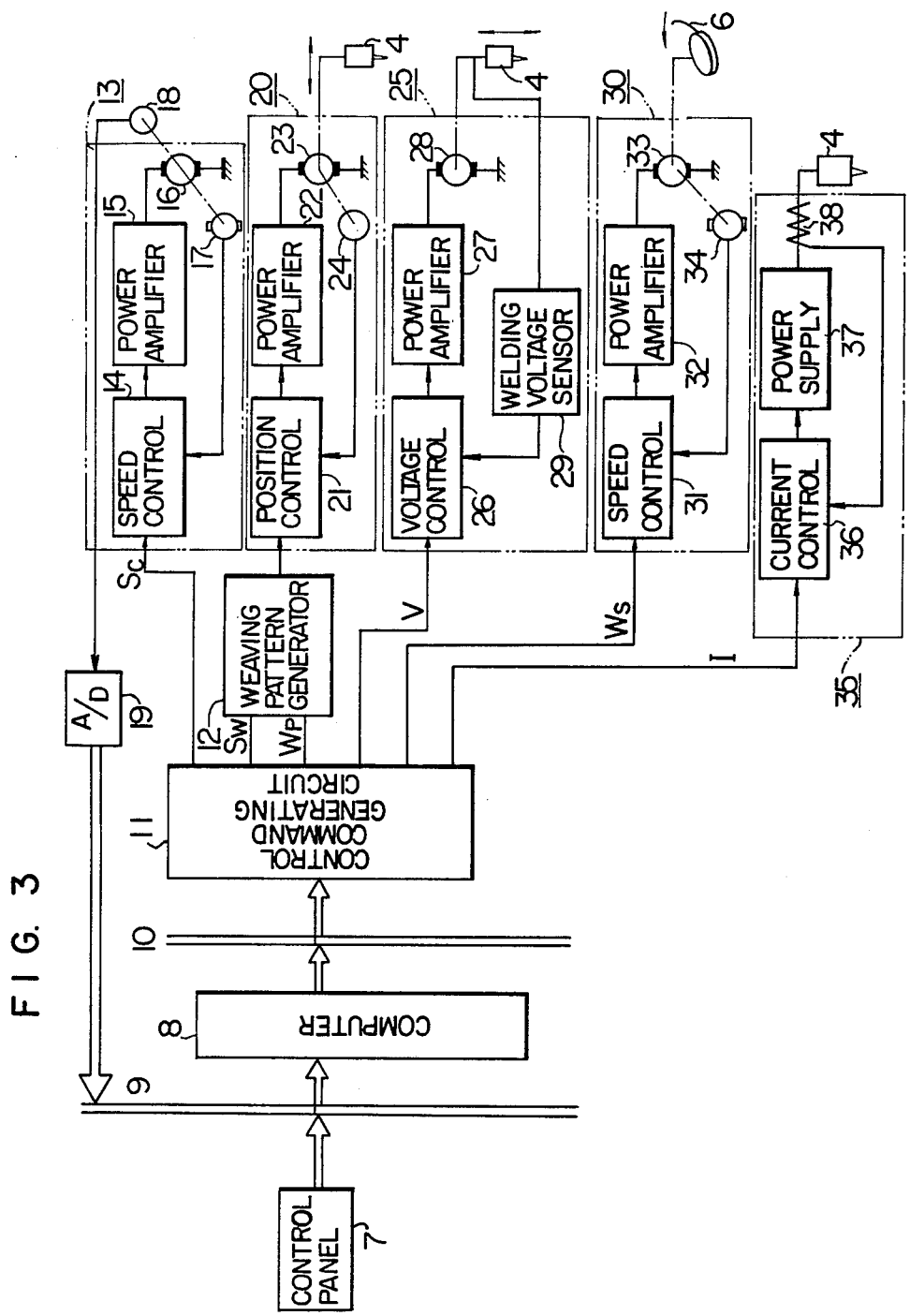
FIG. 3 is a block diagram showing one embodiment of a control apparatus of an automatic pipe welder in accordance with the present invention.

FIG. 3 shows a control apparatus of the present invention for the welder 1 described above. A control panel 7 includes a keyboard for setting welding conditions for respective welding areas on the periphery of the pipe, which conditions are stored in a digital storage device of a computer 8. The computer 8 receives data on the welding conditions via an input bus 9 and provides an output signal to a control command generation circuit 11 via an output bus 10. The control command generating circuit 11 generates control command signals $S_c$, $S_w$, $W_p$, V, $W_s$ and I corresponding to respective welding conditions. The running speed command signal $S_c$ is supplied to a welder running speed control unit 13 which comprises a speed control circuit 14, a power amplifier 15, a motor 16 and a tachogenerator 17. The speed control unit 13 causes the welder to run at a speed determined by the running speed command $S_c$. The rotational angle of the motor 16 is sensed by a potentiometer 18 to sense the position of the welder on the periphery of the pipe and to produce a position signal for the welder, which is supplied to the computer 8 through an analog-digital converter 19 and the input bus 9. The weaving speed command signal $S_w$ and the weaving width command signal $W_p$ are supplied to a weaving pattern generation circuit 12 for conversion into a weaving pattern signal. A weaving control unit 20 comprises a position control circuit 21, a power amplifier 22, a motor 23 and a potentiometer 24, and causes the welding torch 4 to move axially of the pipe in accordance with the weaving pattern signal. The welding voltage command signal V is applied to a welding voltage control unit 25 which comprises a voltage control circuit 26, a power amplifier 27, a motor 28 and a welding voltage sensing circuit 29, and which controls an arc voltage of the welding torch 4 in accordance with the welding voltage command signal V. A wire feeding speed control unit 30 comprises a speed control circuit 31, a power amplifier 32, a motor 33 and a tachogenerator 34 and it controls the feeding speed of the welding wire 6 in accordance with the welding wire feeding speed command signal $W_s$. A welding current control unit 35 comprises a current control circuit 36, a welding power supply 37 and a current detector 38, and it controls a current to the torch 4 in accordance with the welding current command signal I. Those control units are known per se and hence they are not explained in detail.

Before starting the welding, the welding conditions for the respective welding areas are entered from the control panel 7 via the input bus 9 to the computer 8. As a result, all of the welding conditions are stored in the digital storage device of the computer 8. After the welding conditions have been stored in the computer 8, the welding is initiated.

FIG. 4 shows the contents of the digital storage device of the computer 8, in which the welding conditions are stored in the respective addresses. A format of a word in each of the address is shown in FIG. 5. RWC is always a binary "1" number at all addresses, ADC is a binary "0" number at the addresses A, A+6, . . . where the welder running speed information are stored, a binary "1" number at the addresses A+1, A+7, . . . where the weaving speed information are stored, a binary "2" number at the addresses A+2, A+8, . . . where the weaving width information are stored, a binary "3" number at the addresses A+3, A+9, . . . where the welding voltage information are stored, a binary "4" number at the addresses A+4, A+10, . . . where the welding wire feeding speed information are stored and a binary "5" number at the addresses A+5, A+11, . . . where the welding current information are stored, and DAIN is a binary number corresponding to respective welding conditions. The RWC, ADC and DAIN are taken out as read/write designation signal, address designation signal and data signal, respectively.

Figures 6, 8:
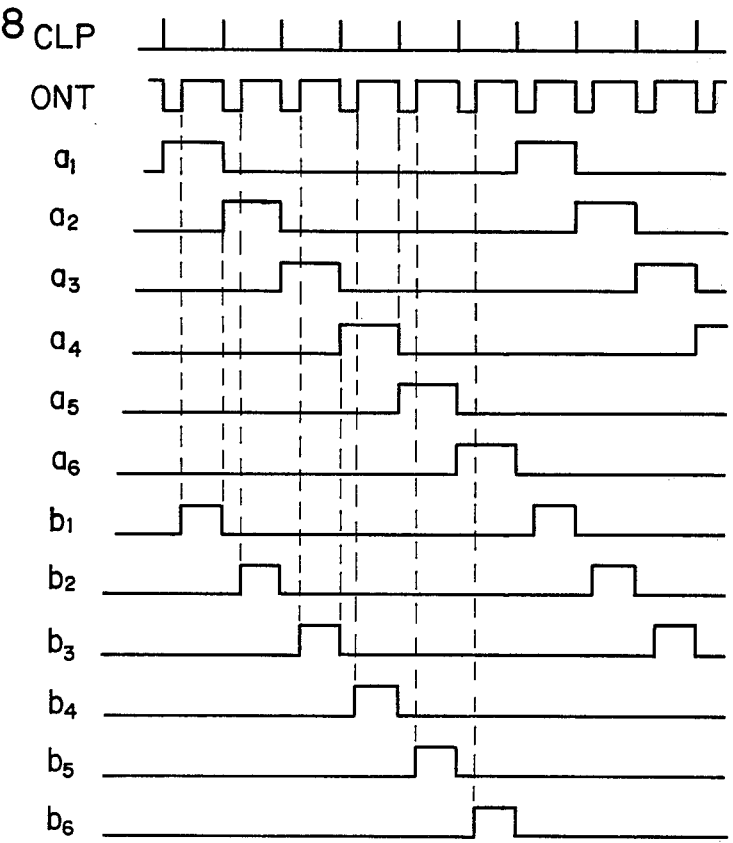
FIG. 6 shows the contents of a digital storage device which stores the welding conditions for a welding area currently being welded.
FIG. 8 shows waveforms for illustrating the generation of gate signals to be applied to sample and hold circuits included in the control command generation circuit of FIG. 7.

When the welding is initiated, a start welding key on the control panel 7 is operated to designate the addresses A to A+5 where the welding conditions set for the first welding area (the area Ⓐ — Ⓑ in FIG. 1) are stored, and those welding conditions are set into the digital storage device 40 (FIG. 7) in the control command generating circuit 11. In this case, the addresses of the storage device 40 at which the welding conditions are respectively to be stored are designated by the address designation signal ADC, and the welding conditions stored in the storage device is shown in FIG. 6. The operation of storing the welding conditions in the storage device 40 will be apparent from the description made, in conjunction with FIG. 7, with respect to the case where the welding conditions stored in the storage device 40 is changed. The control command generating circuit 11 supplies the control command signals $S_c$ through I to the respective control units in accordance with the welding conditions stored in the storage device 40 so that the welding is effected in the first welding area in accordance with those welding control commands. When the welder 1 moves into the adjacent welding area Ⓑ — Ⓒ, a position signal corresponding to the point Ⓑ is supplied to the computer 8 so that the addresses A+6 to A+11 at which the welding conditions for the welding area Ⓑ — Ⓒ are stored are designated by the position signal and those welding conditions are extablished in the digital storage device 40 in the command generating circuit 11, which then generates the control command signals in accordance with the newly established welding conditions. Thus, the welder 1 is controlled to effect the welding in accordance with the new welding conditions. In this manner, the digital storage device 40 in the control command generating circuit 11 maintains the welding conditions on the current welding area until the welder 1 moves past the current welding area into the succeeding welding area. That is, the digital storage device 40 stores the welding conditions on the welding area currently being welded.

Figure 7:
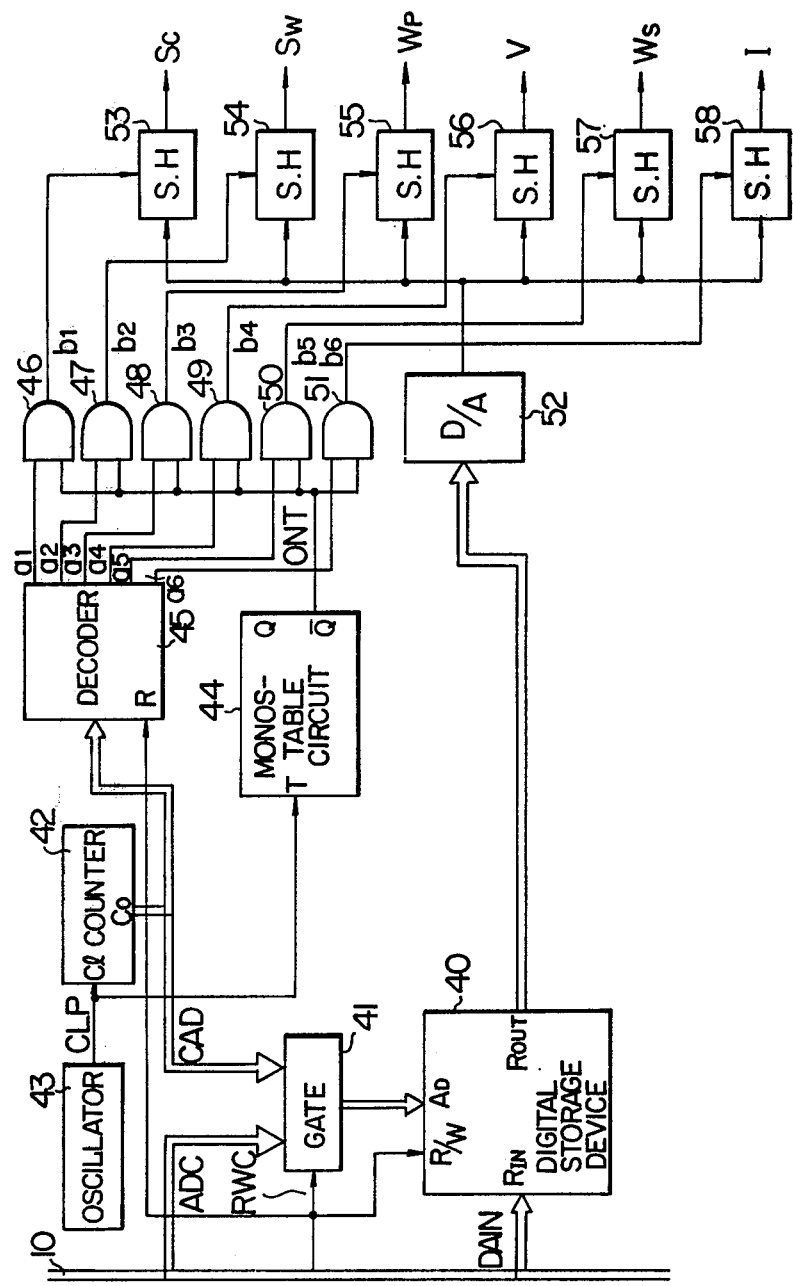
FIG. 7 shows a block diagram of a control command generating circuit included in the control apparatus of FIG. 3.

FIG. 7 shows an embodiment of a configuration of the control command generating circuit 11. When the welder 1 being controlled under particular welding conditions reaches a position on the periphery of the pipe at which the welding conditions are to be changed, e.g. at the point ⓑ in FIG. 1, the position signal corresponding to that position is supplied to the computer 8 as described above. The computer 8 designates the addresses A+6 to A+11 of the digital storage device in the computer 8 in accordance with the position signal so that the data signals DAIN for the welding conditions for the succeeding welding area ⓑ — ⓒ are read out together with the address designation signals ADC and the read/write designation signals RWC. The signals RWC designate whether the data are to be written into the digital storage device 40 from the computer 8 or the contents of the storage device 40 are to be read out. Since the signals RWC have been stored together with the data signals DAIN of the welding conditions at the respective addresses of the digital storage device in the computer 8, they are always at "1" level when the welding conditions are read out of the computer, that is, when the welding conditions are written into the digital storage device 40. The signals RWC are supplied to the digital storage device 40 to establish a write mode thereof and also supplied to the gate circuit 41 to control the same such that the address designation signals ADC are used to designate the addresses of the digital storage device 40. The signals RWC are also supplied to a decoder circuit 45 to reset the same so that the outputs $a1$ to $a6$ thereof assume "0" level. Accordingly, outputs $b1$ to $a6$ of AND circuits 46 to 51, which are to be supplied to sample and hold circuits 53 to 58 as gate signals, are not produced.

When the addresses A+6 to A+11 of the digital storage device in the computer 8 are designated and the contents at the address A+6 are first read out, the digital storage device 40 is set into the write mode by the read/write designation signal RWC. Simultaneously, the address designation signal ADC representative of the address "0" is supplied to the digital storage device 40 through the gate circuit 41 to designate the address "0" of the storage device 40. The data signal DAIN representative of the welder running speed is supplied to the storage device 40 so that the welder running speed data is stored at the designated address "0". Then, when the contents of the address A+7 are read out, the storage device 40 is set into the write mode by the read/write designation signal RWC. At the same time, the address designation signal ADC representative of the address "1" is supplied to the storage device 40 through the gate circuit 41 to designate the address "1". The data signal DAIN representative of the weaving speed is supplied to the storage device 40 so that the weaving speed data is stored at the designated address "1". In a similar manner, the weaving width data, welding voltage data, welding wire feeding speed data and welding current data are stored at the addresses "2", "3", "4" and "5" of the storage device 40, respectively. It should be readily understood that the addresses A+6 to A+11 may be read out in any sequence.

When the contents of the addresses A+6 to A+11 have been read out, the signal RWC changes to "0" level. As a result, the digital storage device 40 is set to the read mode and the gate circuit 41 allows to pass therethrough an output signal CAD of a counter 42 instead of the address designation signal ADC from the computer 8. Therefore, the digital storage device 40 produces at an output terminal $R_{OUT}$ thereof the contents at the address designated by the output signal CAD of the counter 42. The digital signal from the digital storage device 40 is converted by a digital-analog converter 52 into an analog signal. The counter 42 counts up clock pulses CLP of a fixed frequency generated by an oscillator 43 to produce binary number "0", "1", "2", "3", "4" or "5" as the signal CAD. The signal CAD is a periodic signal and the same binary number is generated periodically. Accordingly, the address of the digital storage device 40 is repeatedly designated at a predetermined interval so that each of the digital signals representative of the welding conditions is repeatedly produced.

The output signal CAD of the counter 42 is supplied to the decoder circuit 45 and converted to pulse signals $a1$ to $a6$ as shown in FIG. 8. The clock pulses CLP of the oscillator 43 are also applied to a monostable circuit 44 which produces a signal ONT as shown in FIG. 8. The pulse signals $a1$ to $a6$ are supplied to the corresponding AND circuits 46 to 51 respectively and the pulse signal ONT is applied to the AND circuits 46 to 51 in common so that the AND circuits produce at their outputs signals $b1$ to $b6$ as shown in FIG. 8. The pulse signals $b1$ to $b6$ are supplied to the corresponding sample and hold circuits 53 to 58 as gate signals.

Figure 9:
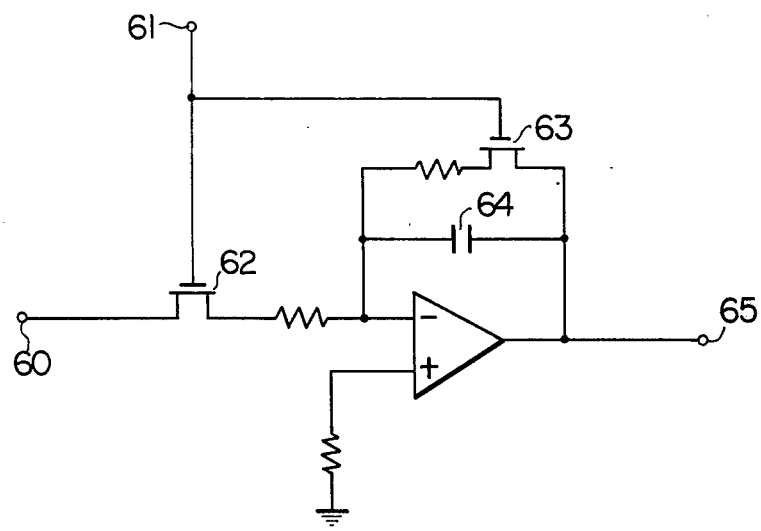
FIG. 9 shows a circuit diagram of an embodiment of the sample and hold circuit included in the control command generation circuit of FIG. 7.

The sample and hold circuit may be of known type and they may be constructed as shown in FIG. 9. An input terminal 60 is connected to the digital-analog converter 52 and receives the analog signal produced from the converter 52 representative of the corresponding welding condition. The gate signal described above is applied via a gate terminal 61 to the gates of FET transistors 62 and 63 operating as switching elements to turn on them. In this manner, the magnitude of the analog signal supplied to the input terminal 60 is stored in a capacitor 64. When the gate signal disappears, the FET transistors are turned off and the charge stored in the capacitor 64 is maintained. In this manner, the sample and hold circuit receives the analog signal from the analog-digital converter 52 only when the gate signal is applied. Thus, the sample and hold circuit receives only the analog signal which is in synchronism with the applied gate signal. For example, the sample and hold circuit 53 receives the pulse signal $b1$ as the gate signal. The pulse signal $b1$ corresponds to the output binary number "0" of the counter circuit 42 and the address "0" of the digital storage device 40 is designated so that the welder running speed data is read out and the analog signal representative of the welder running speed is generated from the digital-analog converter 52. Accordingly, the sample and hold circuit 53 receives the analog signal representative of the welder running speed. At this time, other sample and hold circuits 54 to 58 are not affected because no gate signal is applied to them. Similarly, the analog signal representative of the weaving speed is applied to the sample and hold circuit 54. At this time, other sample and hold circuits are not affected. The same is true for the remaining sample and hold circuits 55 to 58. Namely, they receive the analog signals representative of the weaving width, welding voltage, feeding speed of the welding wire and welding current and hold them. As will be apparent from the above description, the analog signals are supplied to the respective sample and hold circuits repeatedly at the fixed interval. The output terminals 65 of the sample and hold circuits 53 to 58 always provide the analog signals being held as the command signals $S_c$, $S_w$, $W_p$, V, $W_s$ and I.

During changing the contents of the digital storage device 40, the AND circuits 46 to 51 do not produce the pulse signals $b1$ to $b6$ as described above and hence the FET transistors are non-conductive. Accordingly, the sample and hold circuits 53 to 58 maintain respective analog signals representative of the welding conditions before the change. This assures the continuity of the welding control operation during the updating of the welding conditions.

As seen from FIGS. 8, the leading edges of the pulse signals $b1$ to $b6$ are delayed from the leading edges of the respective pulse signals $a1$ to $a6$, by a predetermined time interval. Namely, the monostable circuit 44 and the AND circuits 46 to 51 are provided to delay the leading edges of the pulse signals $a1$ to $a6$ by the predetermined time interval. The delay time is set to be substantially equal to a time required for the converting operation of the digital-analog converter 52. As a result, the analog signal is supplied to the sample and hold circuit after the conversion of the digital signal into the analog signal has been completed.

As described above, the sample and hold circuit receives the input signal repeatedly at the constant interval. This interval may be shortened but for a limitation by the conversion characteristic of the digital analog converter 52. Therefore, the input signal can be supplied at a shorter interval relative to the time constant of the leakage of the sample and hold circuit. As a result, the control precision can be enhanced and use of a circuit construction having a poor hold characteristic may be allowed. Accordingly, the construction is simplified and cheaper elements can be used. The signal conversion means required by the introduction of the computer may be only the single digital to analog converter 52 and the single analog to digital converter 19. Further, the digital storage device 40 requires a small storage capacity. Therefore, the control apparatus is not rendered complex by the introduction of the computer. Furthermore, after the welding conditions have been stored in the digital storage device 40, the operation of the computer is no longer required during the welding operation is effected under those welding conditions. Therefore, the computer may be used for other purposes so that the availability of the computer is enhanced.

In the embodiment described above, the digital storage device 40 is provided separately from the computer 8 and the single digital-analog converter 52 is used. As an alternative, the digital storage device 40 may be a portion of a memory in the computer, or a plurality of digital-analog converters may be provided for each or several sample and hold circuits.

FIG. 10 shows an embodiment suited for a welder position sensor using a potentiometer. In FIG. 10, the welder 1 runs on the periphery of the pipe 2 by driving a guide gear 71 fixed to the welder 1 and to a movable ring 70, by means of a motor 16. A stationary ring 72 is provided on the periphery of the pipe 2 and a limit switch 73 is attached to the stationary ring 72 as a contactor. The position of the limit switch 73 is set to a welding starting reference point. The welder 1 is provided with a projection 74 which turns on the limit switch 73 at the reference point. A potentiometer 18 is driven by the motor 16 simultaneously with the drive of the welder 1 to produce a voltage corresponding to the position of the welder 1.

When the welder 1 exists at the welding starting reference point, e.g. at the point Ⓐ in FIG. 1, the potentiometer 18 produces a voltage $V_o$. When the limit switch 73 is turned on by the projection 74, a signal is supplied from a power supply $P_o$ to a sample and hold circuit 75 which has a similar construction to that shown in FIG. 9. The signal generated by the turn-on of the limit switch is applied as a gate signal to the FET transistors operating as switching elements. Therefore, the voltage $V_o$ is held by the sample and hold circuit 75. This voltage $V_o$ is always applied via a sign converter 76 to an adder 77. The sign converter 76 and the adder constitute a subtractor. As the welder moves to any position, a voltage $V_x$ produced by the potentiometer is supplied to the adder 77. Thus, the output voltage of the adder 77 is equal to $V_x - V_o$. This voltage $V_x - V_o$ is converted by the analog-digital converter 19 to a digital signal as a position signal, which is then supplied to the computer 8.

Assuming that the voltage change of the potentiometer when the welder 1 has completed one revolution around the pipe is $V_{12}$, the voltages $V_2$, $V_4$, $V_6$, $V_8$ and $V_{10}$ corresponding to the points Ⓑ to Ⓕ in FIG. 1 which are located at two, four, six, eight and ten o'clock positions of a clock dial are represented by:

$$V_n = V_{12}/12 \times n, (n=2,4,6,8,10) \qquad (1)$$

The voltage $V_n$ determined by the formula (1) is stored in the computer 8 so that the computer 8 can compare the voltage $V_n$ with the voltage $V_x - V_o$ to sense the position of the welder 1 by the coincidence thereof. For example, when the voltage $V_x - V_o$ coincides with $V_2$, it is determined that the welder 1 exists at the position Ⓑ. When the voltage $V_x - V_o$ coincides with $V_n$, the welding conditions are to be changed. When both voltages coincide, an address designation signal is generated to designate addresses at which new welding conditions are stored. For example, when the voltage $V_x - V_o$ coincides with $V_2$, the addresses A+6 to A+11 of the digital storage device in the computer 8 are designated and the welding conditions stored at the addresses A+6 to A+11 are read into the digital storage device 40.

The welder position sensor of FIG. 10 can eliminate the difficulty of adjustment encountered in making the welding starting reference point on the periphery of the pipe to be coincide with an electrical reference point of the potentiometer.

In FIG. 4, the welding conditions stored in the storage device has been shown assuming that the welding operation is completed when the welder 1 has completed one revolution around the pipe, that is, the welding operation terminates with single layer welding. In case the multi-layer welding where the welder 1 makes several revolutions around the pipe to effect welding of multiple layers, the welding conditions of the respective areas as shown in FIG. 4 are stored for each of the layers. FIG. 11 shows the contents of the digital storage device in the computer 8 which include all the welding conditions for the multi-layer welding. Even in this case, the digital storage device 40 stores the welding conditions as shown in FIG. 6 for each layer and for each welding area. In case of the multi-layer welding, the number of revolution of the welder 1 around the pipe, that is, the number of the layer where welding is effected is detected in order to designate the addresses of the storage device in the computer 8. To this end, the position sensor of FIG. 10 is provided with a counter circuit 78 which counts up signals supplied to the sample and hold circuit 75 in response to the turn-on of the limit switch 73, to produce binary number signal. This binary number signal indicates the number of revolutions of the welder 1 around the pipe and in this sense it is an additional position signal to the position signal produced from the adder 77. The binary number signal is supplied to the computer 8. The computer 8 designates the addresses of the digital storage device in the computer 8 in accordance with the binary number signal produced from the counter circuit 78 and the address designation signal produced by the coincidence of the voltages $V_x - V_o$ and $V_n$. According to the present invention, it is sufficient to store the welding conditions in the storage device of the computer 8 from the control panel 7. Therefore, the control panel 7 may be of simple structure. Further, since the digital storage device is used instead of the welding condition setting potentiometers, which are a type of storage device, the storage device does not require a large space even when there are many welding conditions to be set like in the case of multi-layer welding. Thus, much finer setting and adjustment of welding conditions than those in the prior art can be attained.

We claim:

1. A control apparatus for controlling an automatic pipe welder which effects continuous welding along a welding line on a periphery of a pipe, in accordance with predetermined welding conditions previously set to each of a plurality of welding areas sectioned along said welding line, said control apparatus comprising:
   - a plurality of control units provided respectively for said welding conditions and receiving respective control commands representative of the welding conditions to control the operation of said welder in accordance with the received control commands;
   - a first digital storage device for storing the welding conditions relating to one of said welding areas at which said welder is present;
   - a position sensing device for producing a position signal corresponding to the position of said welder;
   - a second digital storage device for storing all of the welding conditions for said welding areas and for changing the welding conditions stored in said first digital storage device when the second digital storage device receives the position signal indicative of the position of the welder at which the welding conditions are to be changed;
   - at least one digital-analog converter for converting digital signals produced from said first digital storage device indicative of said welding conditions stored in said first digital storage device, into analog signals; and
   - a plurality of sample and hold circuits provided respectively for said welding conditions for holding respective analog signals for a predetermined time period and delivering said analog signals as said contol commands.

2. A control apparatus according to claim 1, further comprising an oscillator for generating clock signals and a counter circuit for receiving said clock signals to produce a plurality of signals of different values which are produced repeatedly at a fixed interval, said first digital storage device being supplied with the output signals of said counter circuit as an address designation signal, whereby said digital signals are repeatedly produced.

3. A control apparatus according to claim 2, further comprising a decoder circuit for converting the output signals of said counter circuit to pulse signals, said sample and hold circuits being supplied respectively with said pulse signals as gate signals to receive said analog signals only when receiving respective said gate signals.

4. A control apparatus according to claim 3, wherein said decoder circuit is reset to prevent the generation of said gate signals, during the changing of the welding conditions stored in said first digital storage device, and said sample and hold circuits hold respective analog signals corresponding to the welding conditions stored in said first digital storage device immediately before the initiation of the changing.

5. A control apparatus according to claim 3, further comprising a delay means for delaying the leading edges of said pulse signals produced from said decoder circuit by a predetermined time interval.

6. A control apparatus according to claim 5, wherein said delay means includes a monostable circuit for receiving said clock signals to produce pulse signals and a plurality of AND circuits commonly supplied with said pulse signals from said monostable circuit and respectively supplied with said pulse signals from said decoder circuit.

7. A control apparatus according to claim 1, wherein said position sensing device comprises a sensor positioned at a reference point at which the welding is initiated, for generating a signal in response to passage of the welder through the reference point, a potentiometer for producing a voltage signal corresponding the travel distance of the welder from said reference point, a sample and hold circuit, in response to said signal generated by said sensor, for receiving and holding the voltage signal produced from said potentiometer corresponding to said reference point, and a subtracting circuit for calculating a difference between the output signal of said sample and hold circuit and said voltage signal produced from said potentiometer and delivering the difference as said position signal.

8. A control apparatus according to claim 7, wherein said position sensing device further comprises a counter circuit for counting said signal generated by said sensor to provide an output which is used as an additional position signal cooperative with said position signal.

* * * * *